(12) United States Patent
Fujii

(10) Patent No.: US 11,398,756 B2
(45) Date of Patent: Jul. 26, 2022

(54) EMBEDDED MAGNET TYPE ROTOR

(71) Applicant: DENSO CORPORATION, Kariya (JP)

(72) Inventor: Yuuki Fujii, Kariya (JP)

(73) Assignee: DENSO CORPORATION, Kariya (JP)

( * ) Notice: Subject to any disclaimer, the term of this patent is extended or adjusted under 35 U.S.C. 154(b) by 73 days.

(21) Appl. No.: 17/001,579

(22) Filed: Aug. 24, 2020

(65) Prior Publication Data

US 2021/0066980 A1 Mar. 4, 2021

(30) Foreign Application Priority Data

Aug. 26, 2019 (JP) .............................. JP2019-153658

(51) Int. Cl.
*H02K 1/28* (2006.01)
*H02K 1/276* (2022.01)

(52) U.S. Cl.
CPC ............... *H02K 1/28* (2013.01); *H02K 1/276* (2013.01)

(58) Field of Classification Search
CPC ....... H02K 1/28; H02K 1/276; H02K 2201/09
See application file for complete search history.

(56) References Cited

U.S. PATENT DOCUMENTS

2010/0001606 A1* 1/2010 Ogami ................. H02K 1/2766
310/156.53
2020/0153295 A1* 5/2020 Toida ....................... H02K 7/04

FOREIGN PATENT DOCUMENTS

| JP | 2000-184645 A | 6/2000 |
| JP | 2015226368 A | * 12/2015 |
| JP | 2017-001111 A | 1/2017 |

OTHER PUBLICATIONS

Machine Translation, Ishikawa, JP-2015226368-A, Dec. 2015. (Year: 2015).*

* cited by examiner

*Primary Examiner* — Thomas Truong
(74) *Attorney, Agent, or Firm* — Maschoff Brennan

(57) ABSTRACT

An embedded magnet type rotor has a laminated core which is formed by laminating a plurality of steel plates, and a magnet provided in a magnet insertion hole of the laminated core, and an end plate provided at an end portion of the laminated core so as to close the magnet insertion hole. The pair of adjacent steel plates are fixed by pressing a steel plate fixing protrusion of one first steel plate into a steel plate fixing hole of the other first steel plate. The end plate and the laminated core are fixed by pressing a plate fixing protrusion of the end plate into a plate fixing hole of the laminated core. The steel plate fixing hole and the plate fixing hole are alternately arranged in a circumferential direction.

10 Claims, 10 Drawing Sheets

EMBEDDED MAGNET TYPE ROTOR

CROSS REFERENCE TO RELATED APPLICATION

The present application is based on Japanese Patent Application No. 2019-153658 filed on Aug. 26, 2019, the disclosures of which are incorporated herein by reference.

TECHNICAL FIELD

The present disclosure relates to an embedded magnet type rotor.

BACKGROUND

An embedded magnet type rotor has a laminated core provided with a magnet insertion hole, a magnet inserted into the magnet insertion hole, and an end plate for closing the magnet insertion hole to prevent scattering of the magnet.

SUMMARY

An object of the present disclosure is to provide an embedded magnet type rotor in which a decrease in magnetic characteristics is suppressed.

The present disclosure relates to an embedded magnet type rotor used for a rotating electric machine. The embedded magnet type rotor has a laminated core which is formed by laminating a plurality of steel plates, and a magnet provided in a magnet insertion hole of the laminated core, and an end plate provided at an end portion of the laminated core so as to close the magnet insertion hole.

The pair of adjacent first steel plates are fixed by pressing a steel plate fixing protrusion of one first steel plate into a steel plate fixing hole of the other first steel plate. The end plate and the laminated core are fixed by pressing a plate fixing protrusion of the end plate into a plate fixing hole of the laminated core. The steel plate fixing hole and the plate fixing hole are alternately arranged in a circumferential direction.

DETAILED DESCRIPTION

One Embodiment

Figure 1:
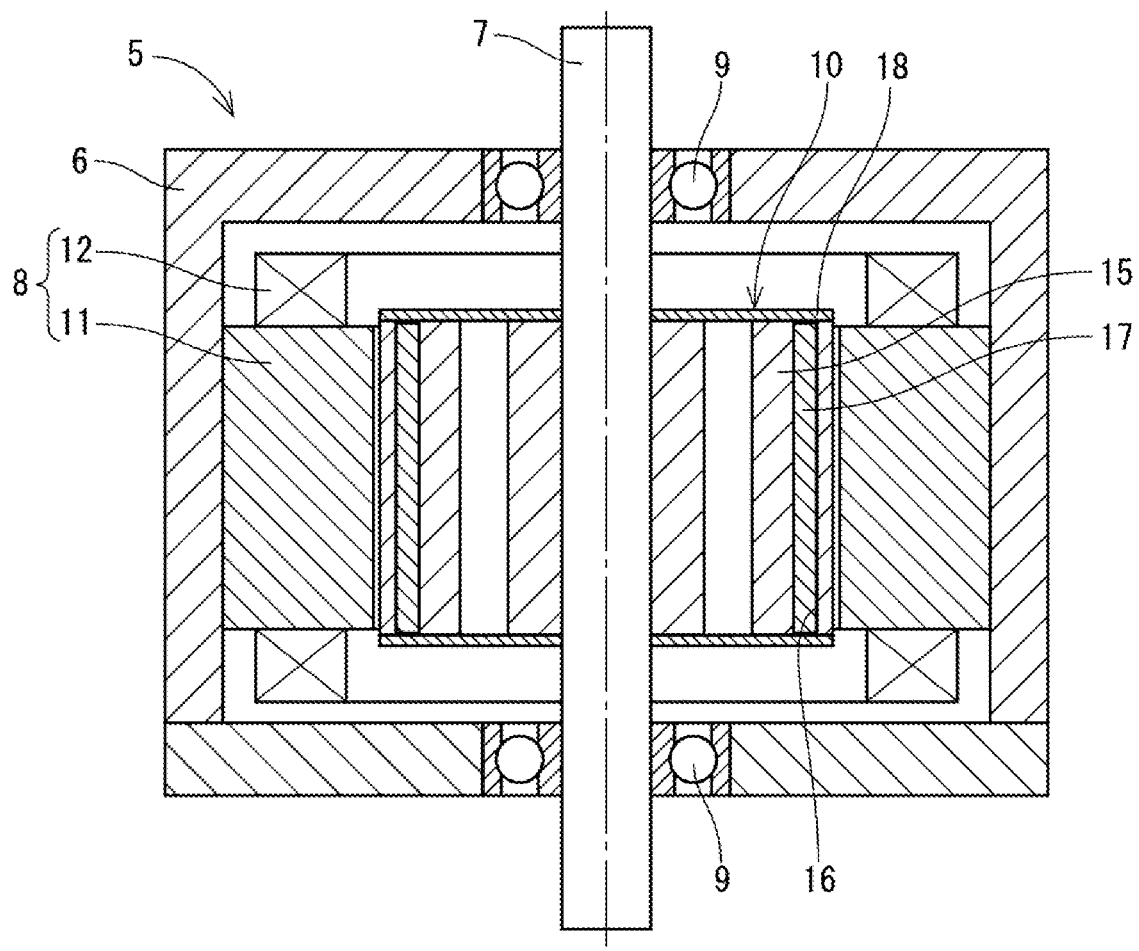
FIG. 1 is a longitudinal sectional view of a rotating electric machine to which an embedded magnet type rotor according to one embodiment is applied.

Hereinafter, an embodiment of an embedded magnet type rotor will be described with reference to the drawings. An embedded magnet type rotor (hereinafter, rotor) according to one embodiment is applied to the rotating electric machine 5 shown in FIG. 1. The rotating electric machine 5 includes a housing 6, a rotating shaft 7, a stator 8, and a rotor 10.

The rotating shaft 7 is rotatably supported by the housing 6 via a pair of bearings 9. The stator 8 has a stator core 11 fixed to the housing 6 and a winding 12 assembled to the stator core 11.

Figure 2:
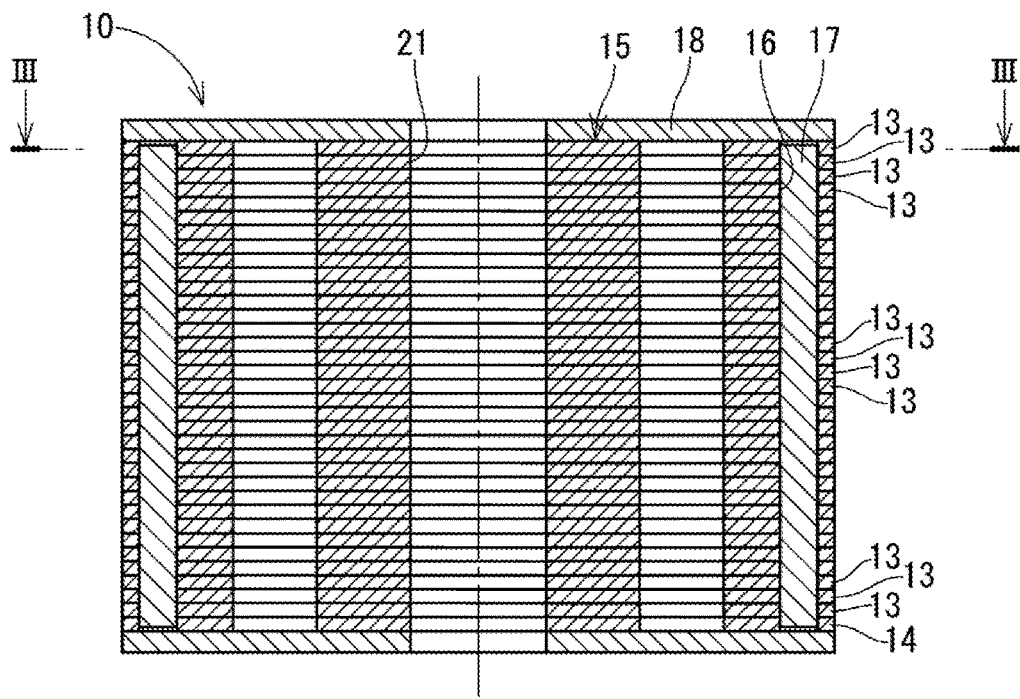
FIG. 2 is a longitudinal sectional view of the embedded magnet type rotor.
Figure 3:
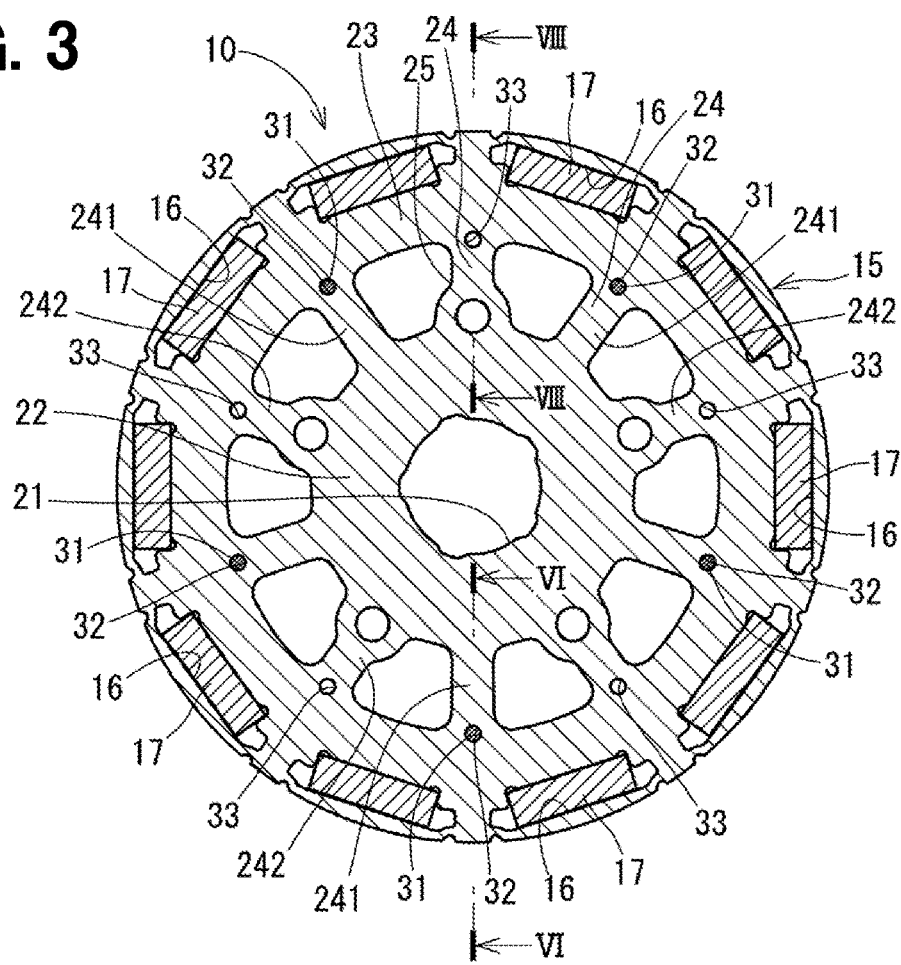
FIG. 3 is a cross-sectional view taken along the line III-Ill of FIG. 2 and is a cross-sectional view of the embedded magnet type rotor.

As shown in FIGS. 2 and 3, the rotor 10 has a laminated core 15 which is formed by laminating a plurality of steel plates 13 and 14, and having a magnet insertion hole 16, a plurality of magnets 17 inserting into the magnet insertion hole 16 of the laminated core 15, and two end plates 18 provided at one end portion and the other end portion of the laminated core 15 so as to close the magnet insertion holes 16.

Hereinafter, a radial direction of the rotor 10 is simply described as "radial direction", a circumferential direction (that is, a rotating direction) of the rotor 10 is simply described as "circumferential direction" or "rotating direction", and an axial direction of the rotor 10 is simply referred to as "axial direction".

As shown in FIG. 3, the laminated core 15 has a shaft holding portion 22, a magnet holding portion 23, and a plurality of connecting portions 24 extending radially from the shaft holding portion 22 to the magnet holding portion 23. The shaft holding portion 22 is located on an inner peripheral side of the laminated core 15 and has an insertion hole 21 through which the rotating shaft 7 is inserted. The magnet holding portion 23 is located on an outer peripheral side of the laminated core 15 and has a magnet insertion hole 16. A plurality of holes 25 for weight reduction are formed between a pair of connecting portions 24 adjacent in the circumferential direction.

Figure 4:
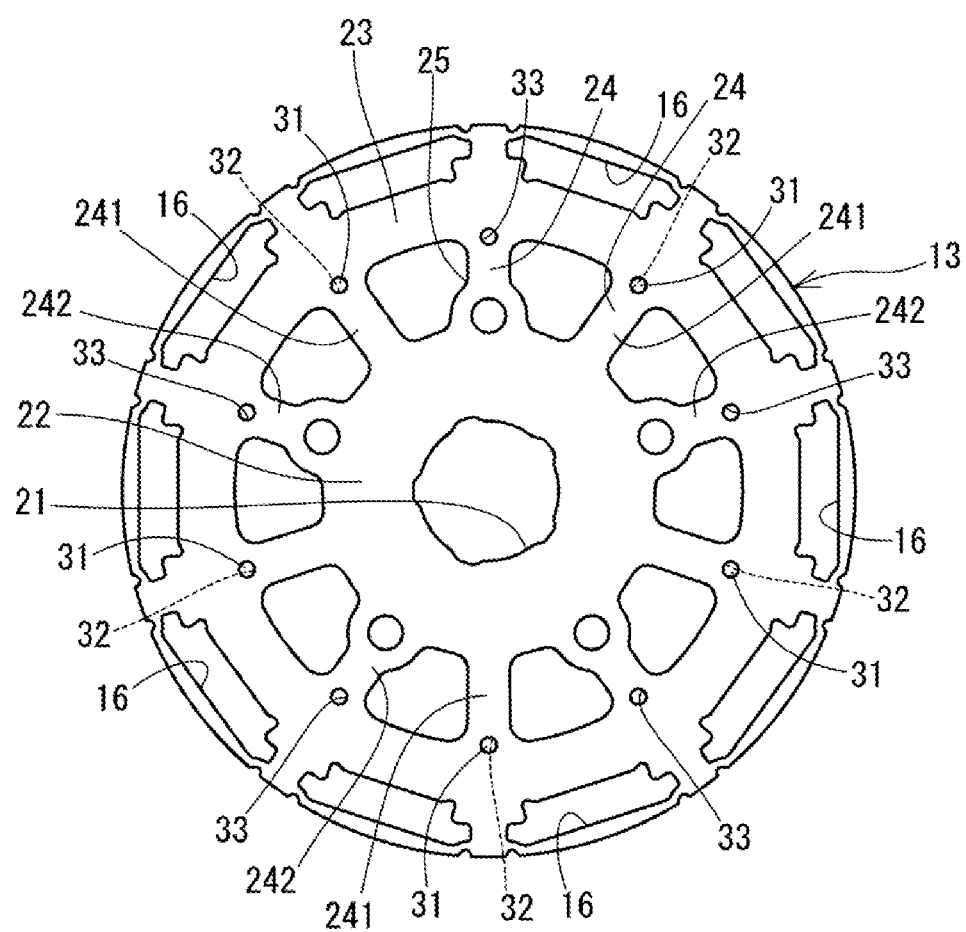
FIG. 4 is a front view of a first steel plate.
Figure 5:
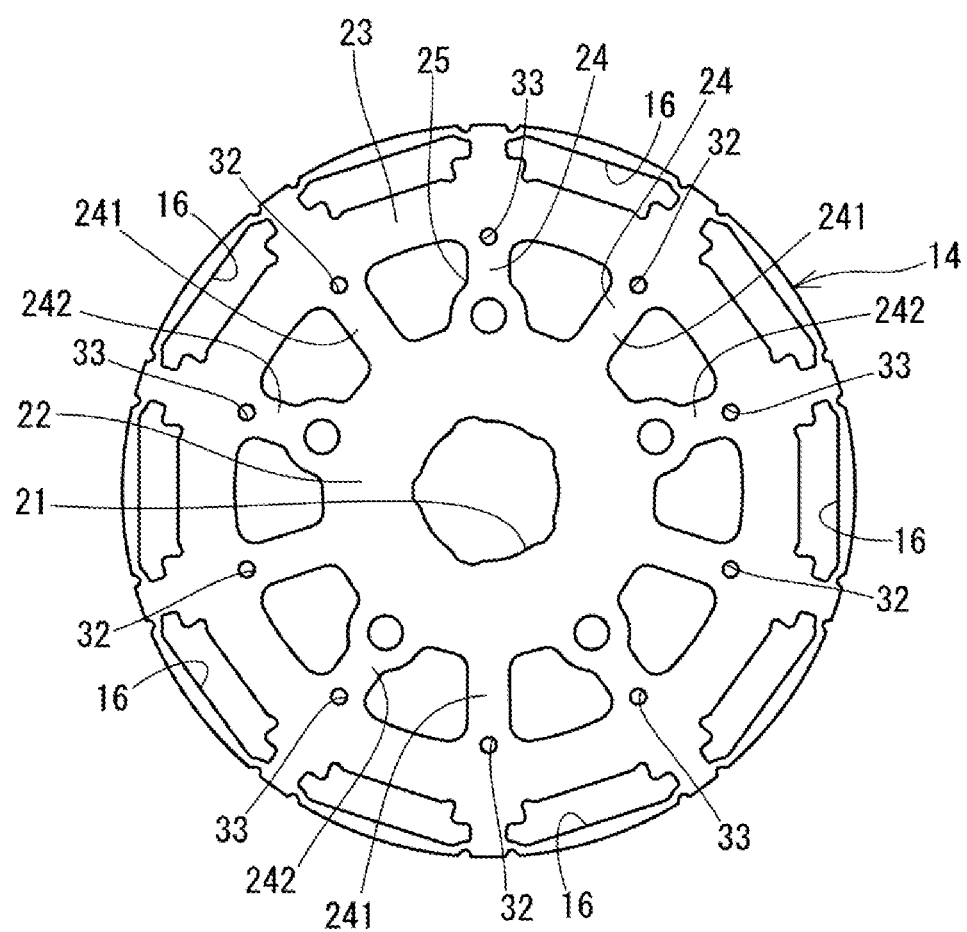
FIG. 5 is a front view of a second steel plate.
Figure 6:
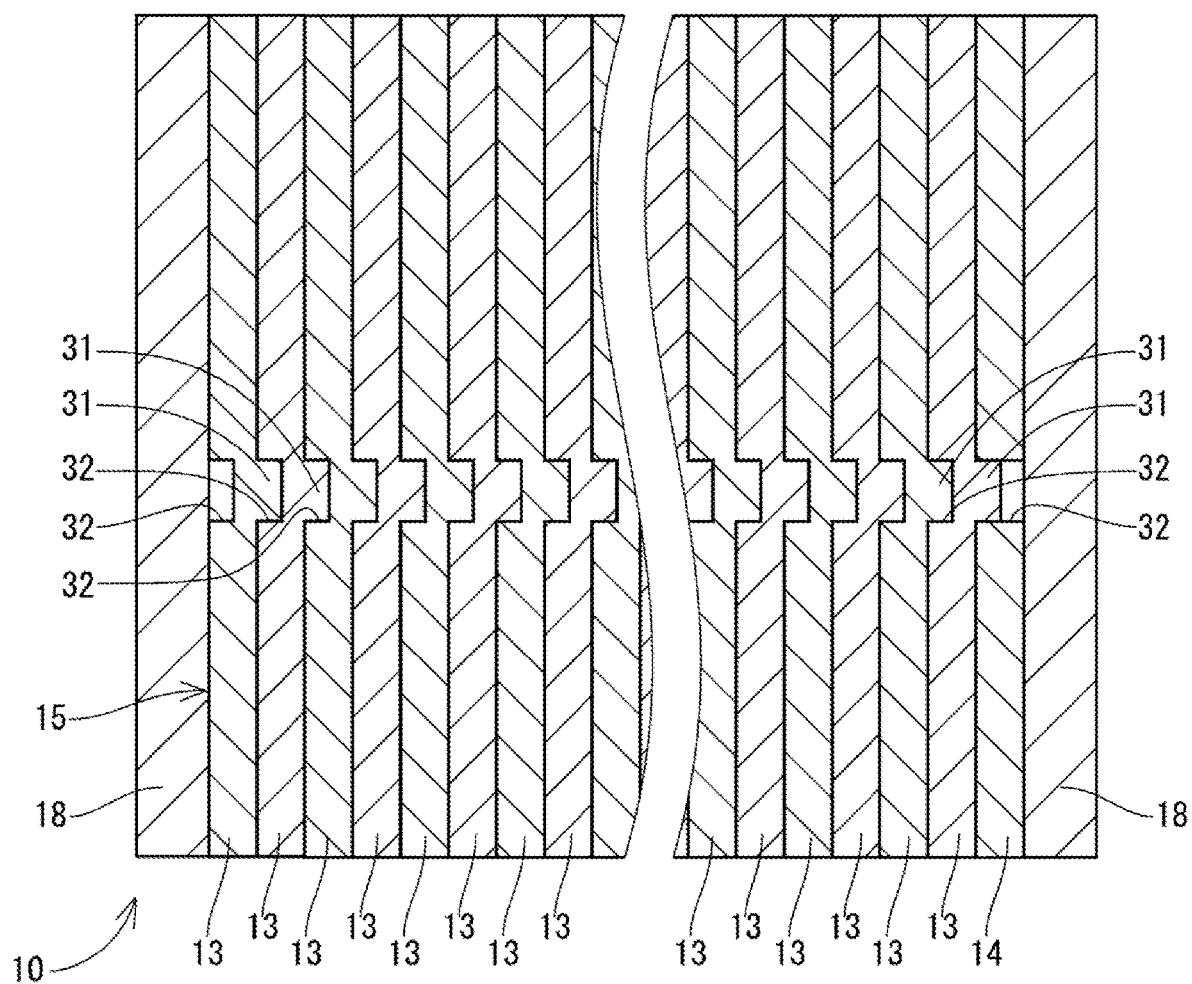
FIG. 6 is a sectional view taken along line VI-VI of FIG. 3, and is a sectional view showing a press-fitting location between a plurality of steel plates.

As shown in FIG. 2, the laminated core 15 includes a plurality of first steel plates 13 and one second steel plate 14. As shown in FIGS. 4 and 6, the first steel plate 13 has a plurality of steel plate fixing protrusions 31, a plurality of steel plate fixing holes 32, and a plurality of plate fixing holes 33. When the steel plate fixing protrusion 31 is formed so as to protrude in a direction of the plate thickness, the steel plate fixing hole 32 of the first steel plate 13 is formed in a recess formed on the side opposite to the side on which the steel plate fixing protrusion 31 is formed. As shown in FIGS. 5 and 6, the second steel plate 14 has a plurality of steel plate fixing holes 32 and a plurality of plate fixing holes 33.

As shown in FIG. 2, the laminated core 15 is divided into a portion where the pair of first steel plates 13 is adjacent and a portion where the first steel plate 13 and the second steel plate 14 are adjacent. As shown in FIG. 6, the pair of adjacent first steel plates 13 are fixed by pressing the steel plate fixing protrusions 31 of one first steel plate 13 into the steel plate fixing holes 32 of the other first steel plate 13. The adjacent first steel plate 13 and second steel plate 14 are fixed by pressing the steel plate fixing protrusions 31 of the first steel plate 13 into the steel plate fixing holes 32 of the second steel plate 14.

Figure 7:
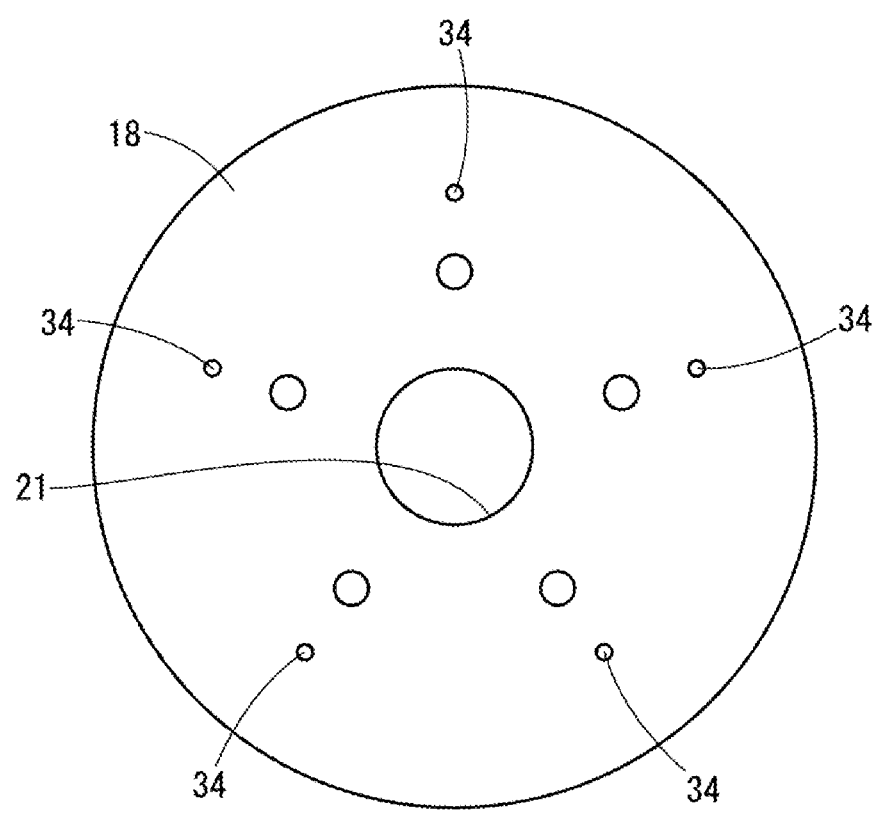
FIG. 7 is a front view of an end plate.
Figure 8:
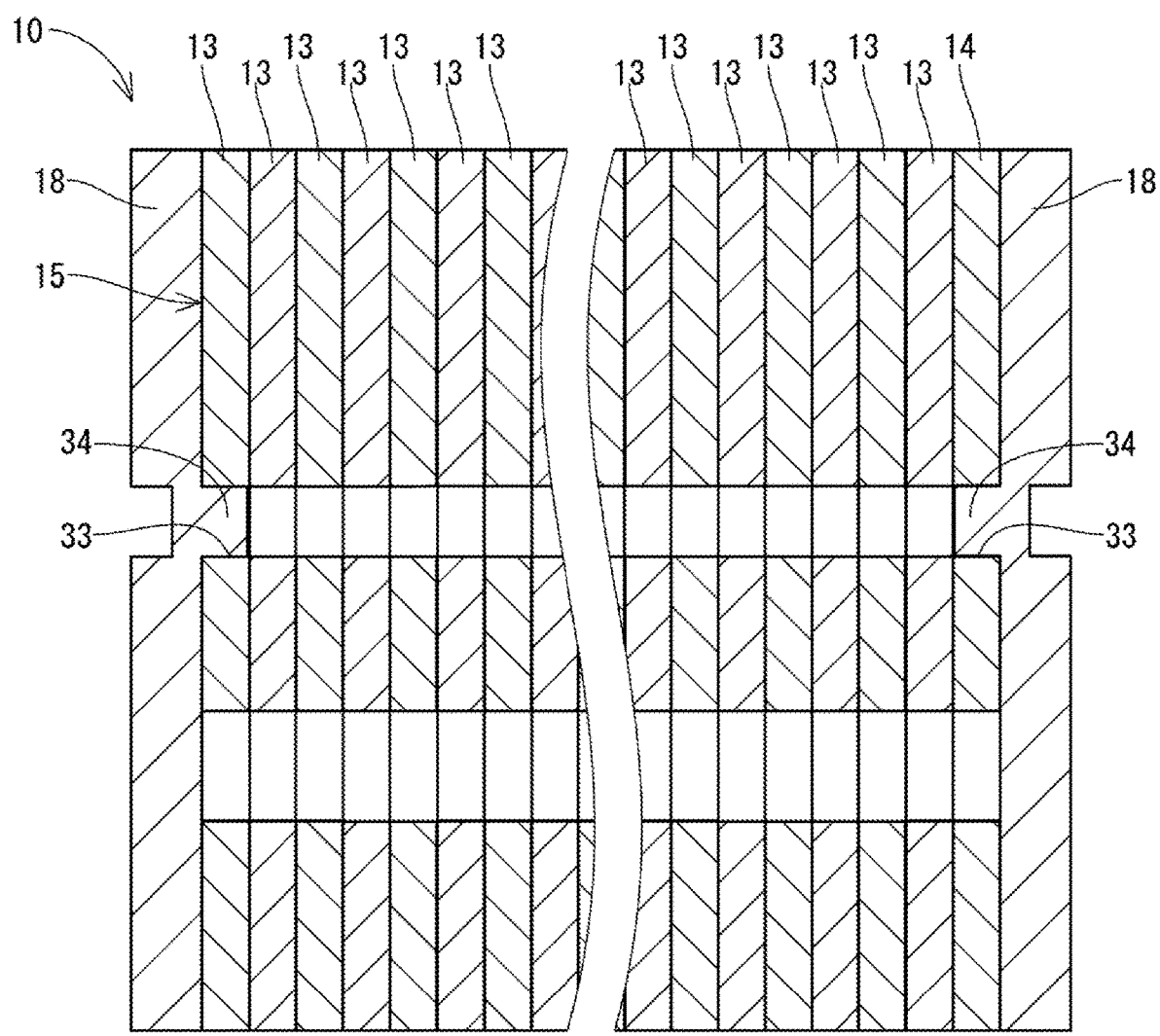
FIG. 8 is a sectional view taken along line VIII-VIII of FIG. 3, and is a sectional view showing a press-fitting location of an end plate.
Figure 9:
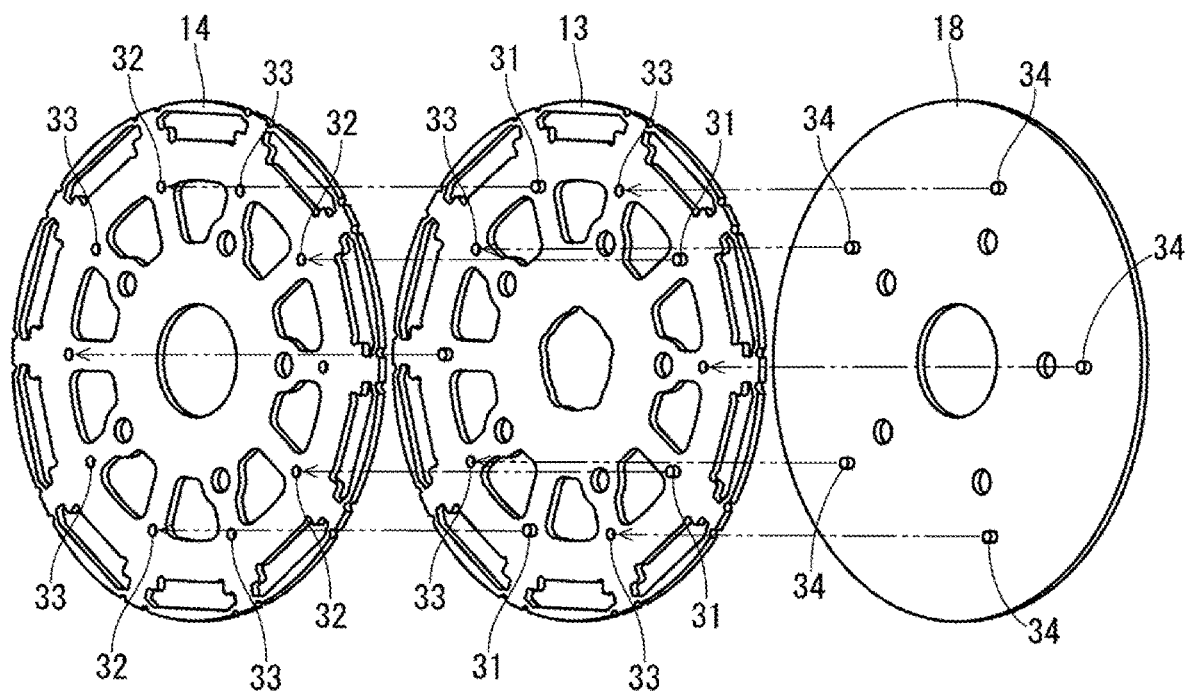
FIG. 9 is an exploded perspective view of each plate constituting the laminated core.

As shown in FIGS. 7 and 8, the end plate 18 has a plate fixing protrusion 34 protruding toward the laminated core 15 (that is, the plate thickness direction). The plate fixing protrusion 34 of one end plate 18 is press-fitted into the plate fixing hole 33 of the first steel plate 13, and the plate fixing protrusion 34 of the other end plate 18 is press-fitted into the plate fixing hole 33 of the second steel plate 14. That is, the end plate 18 and the laminated core 15 are fixed by pressing the plate fixing protrusions 34 of the end plate 18 into the plate fixing holes 33 of the laminated core 15.

Figure 12:
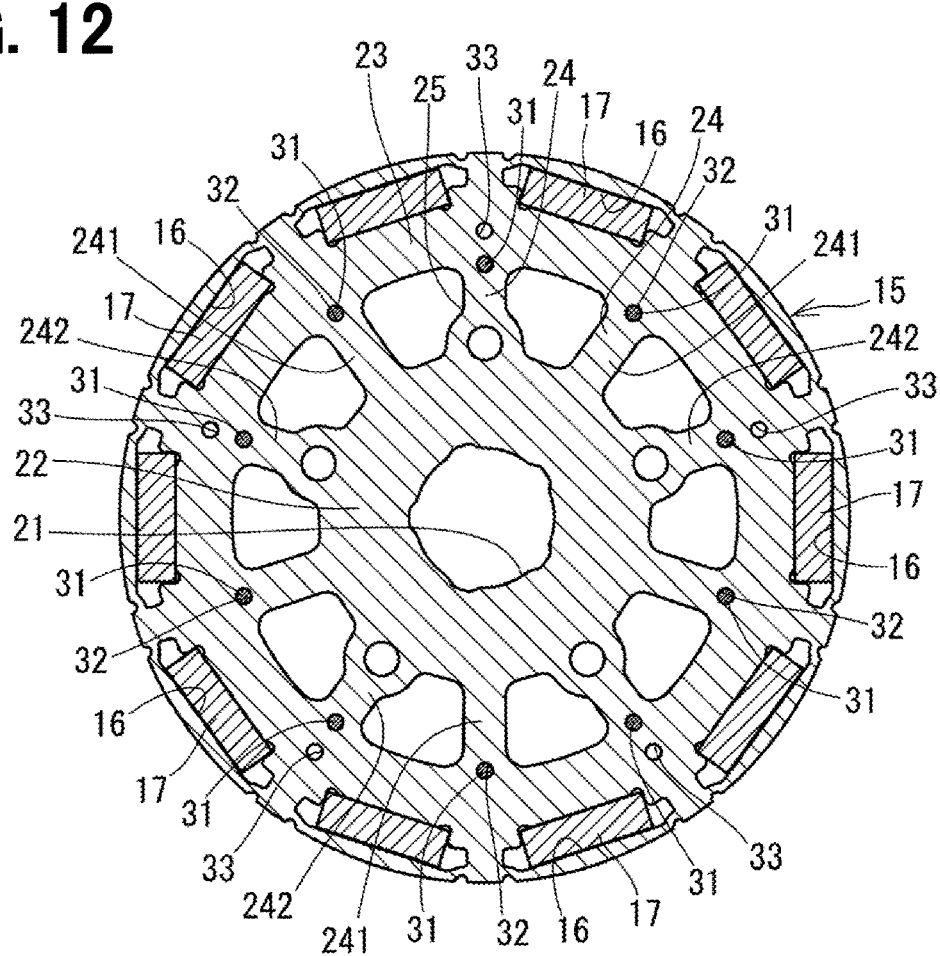
FIG. 12 is a front view of a second steel plate according to a comparative embodiment.

The influence of the press-fitting portion of the end plate 18 on a magnetic characteristics of the rotor 10 will be described. The end plates 18 are provided to prevent the magnet 17 from scattering. In order for the end plate 18 to appropriately receive a load when the magnet 17 is about to scatter, it is necessary to provide a press-fitting location of the end plate 18 as radially outside the laminated core as possible. Further, it is necessary to provide the press-fitting location of the end plate 18 so as to avoid the press-fitting location of a plurality of steel plates 13, 14 constituting the laminated core 15. For this purpose, as in a comparative embodiment shown in FIG. 12, it is conceivable that the press-fitting location of the end plate 18 is provided at a position radially outside the press-fitting location of the plurality of steel plates 13 and 14 and relatively close to the magnet insertion hole 16.

Figure 13:
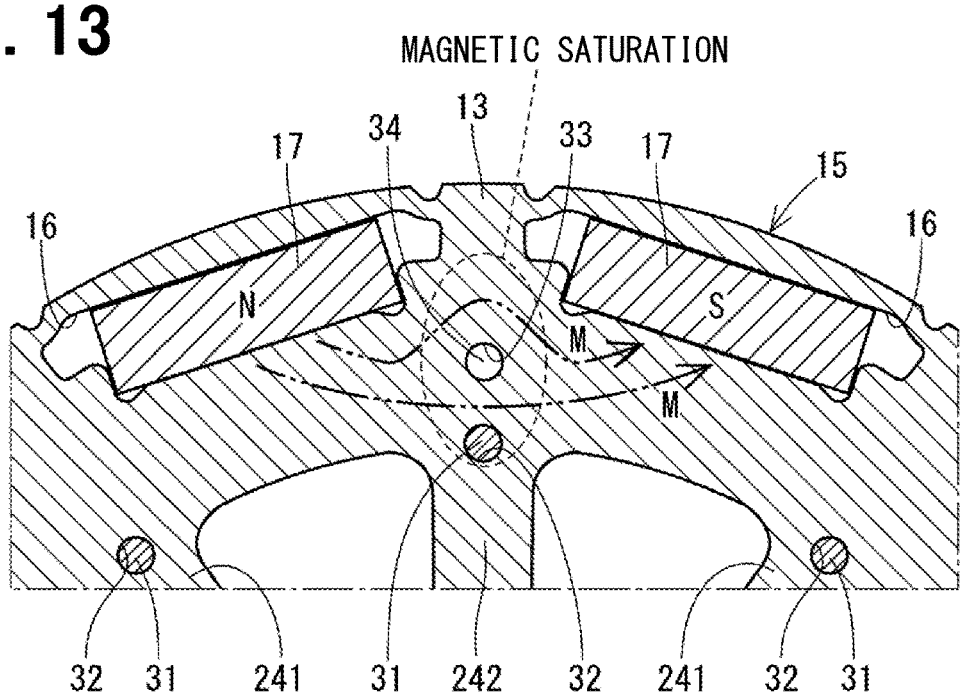
FIG. 13 is a view showing a part of a cross section of the embedded magnet type rotor of FIG. 12, and is a view corresponding to FIG. 10 in one embodiment.

However, as shown in FIG. 13, the magnetic flux M of the magnet 17 does not easily pass through the press-fitting portion of the end plate 18, and magnetic saturation tends to occur on that portion. Therefore, if the press-fitting location of the end plate 18 is provided at a position near the magnet insertion hole 16, the magnetic characteristics of the rotor 10 may be deteriorated. In particular, in the present embodiment, since the end plate 18 is made of austenitic stainless steel, it is remarkable that the magnetic flux does not pass easily due to the formation of the plate fixing protrusion 34.

On the other hand, in the present embodiment, as shown in FIGS. 3 to 5 and FIG. 9, the steel plate fixing holes 32 and the plate fixing holes 33 are alternately arranged in the circumferential direction. That is, the plate fixing holes 33 are not provided radially outward with respect to the steel plate fixing holes 32 as in the comparative embodiment shown in FIG. 12, and are provided in the circumferential direction apart from the steel plate fixing hole 32.

The steel plate fixing hole 32 and the plate fixing hole 33 are arranged at any one of the plurality of connecting portions 24 and at the same circumferential position. Specifically, in the plurality of connecting portions 24, the connecting portions arranged at odd-numbered positions on the basis of a predetermined one are referred to as first connecting portions 241, and the connecting portions arranged at even-numbered positions are referred to as second connecting portions 242. The steel plate fixing holes 32 are arranged at the same circumferential position with respect to the first connecting portions 241, and the plate fixing holes 33 are arranged at the same circumferential position with respect to the second connecting portions 242.

The plurality of connecting portions 24 are provided at equal intervals in the circumferential direction. Therefore, the plurality of steel plate fixing holes 32 are provided at equal intervals in the circumferential direction, and the plurality of plate fixing holes 33 are provided at equal intervals in the circumferential direction. An interval in the circumferential direction between the plurality of steel plate fixing holes 32 is the same as the circumferential interval between the plurality of plate fixing holes 33.

The steel plate fixing hole 32 and the plate fixing hole 33 are arranged at a connection part between the connecting portion 24 and the magnet holding portion 23. The connection part is a part that is positioned as radially outward as possible while avoiding the passage of the magnetic flux of the magnet 17 formed in the magnet holding portion 23.

The steel plate fixing holes 32 and the plate fixing holes 33 are arranged on the same circumference. The circumference is set as radially outward as possible while avoiding the passage of the magnetic flux of the magnet 17 formed in the magnet holding portion 23.

As shown in FIG. 8, a thickness of the end plate 18 is larger than a thickness of the steel plates 13 and 14. As shown in FIGS. 6 and 8, a protruding length of the plate fixing protrusion 34 of the end plate 18 is longer than a protruding length of the steel plate fixing protrusion 31 of the steel plates 13 and 14. On the other hand, as shown in FIGS. 4 and 7, a cross-sectional shape of the plate fixing protrusion 34 is the same as a cross-sectional shape of the steel plate fixing protrusion 31. The same cross-sectional shape means that the shape and size are the same. The cross-sectional shape is, for example, circular.

Effects

Figure 10:
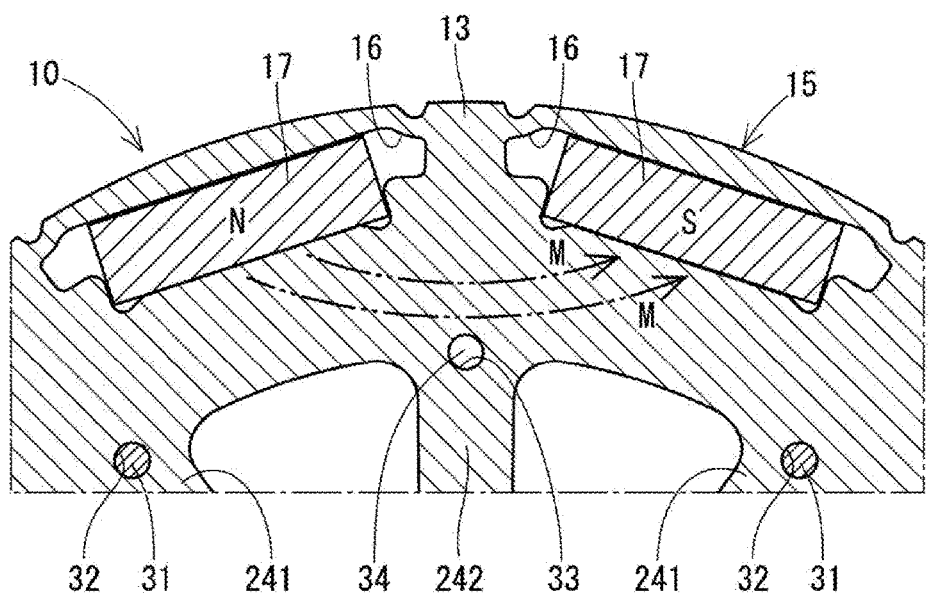
FIG. 10 is a view showing a part of a cross-section of the embedded magnet type rotor of FIG. 3.

As described above, in the present embodiment, the steel plate fixing holes 32 and the plate fixing holes 33 are alternately arranged in the circumferential direction. Thereby, the press-fitting location of the end plate 18 can be provided at a position appropriately separated from the magnet insertion hole 16 while avoiding the press-fitting location between two steel plates 13 and between the steel plates 13 and 14. For this reason, as shown in FIG. 10, the press-fitting location of the end plate 18 is not provided in the path of the magnetic flux M of the magnet 17, and magnetic saturation hardly occurs. That is, the press-fitting location of the end plate 18 can be provided at a position where the magnetic characteristics is not affected. Therefore, a decrease in the magnetic characteristics of the rotor 10 is suppressed.

In the present embodiment, the steel plate fixing holes 32 are arranged at the same circumferential position with respect to the first connecting portion 241, and the plate fixing hole 33 are arranged at the same circumferential position with respect to the second connecting portion 242. Thereby, each press-fitting location can be alternately arranged in the circumferential direction while being provided at a position appropriately separated from the magnet insertion hole 16.

In the present embodiment, the steel plate fixing hole 32 and the plate fixing hole 33 are arranged at the connection part between the connecting portion 24 and the magnet holding portion 23. Thereby, each press-fitting location can be arranged at a position positioned as radially outward as possible while avoiding the passage of the magnetic flux of the magnet 17 formed in the magnet holding portion 23.

In the present embodiment, the steel plate fixing holes 32 and the plate fixing holes 33 are arranged on the same circumference. Thereby, each press-fitting location can be arranged at a position positioned as radially outward as possible while avoiding the passage of the magnetic flux of the magnet 17 formed in the magnet holding portion 23.

In the present embodiment, the end plate 18 is made of austenitic stainless steel. In such a configuration, since it is difficult for the magnetic flux to pass through at the plate fixing protrusions 34, the effect of suppressing the deterioration of the magnetic characteristics by the circumferentially alternate arrangement of the steel plate fixing holes 32 and the plate fixing holes 33 can be effectively obtained.

In the present embodiment, the thickness of the end plate 18 is larger than the thickness of the steel plates 13 and 14. Thereby, the protruding length of the plate fixing protrusion 34 can be made longer than the protruding length of the steel plate fixing protrusion 31. Therefore, the holding force of the end plate 18 can be improved.

Further, in the present embodiment, the cross-sectional shape of the plate fixing protrusion 34 is the same as the cross-sectional shape of the steel plate fixing protrusion 31. Thereby, the mold for molding the plate fixing protrusions 34 and the mold for molding the steel plate fixing protrusions 31 can be shared, and the manufacturing cost is reduced.

Other Embodiments

Figure 11:
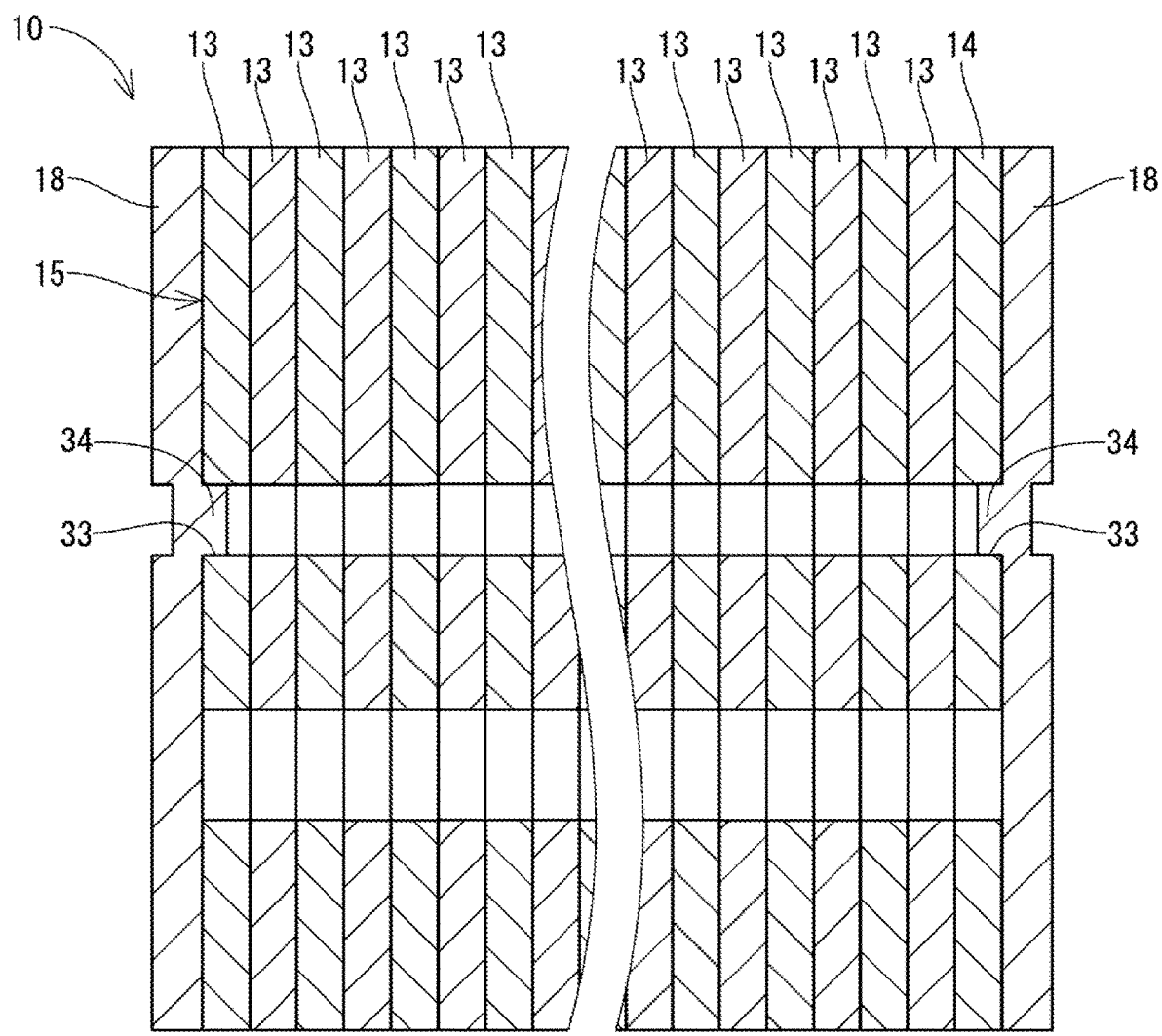
FIG. 11 is a sectional view of an embedded magnet type rotor according to another embodiment, and is a view corresponding to FIG. 8 in one embodiment.

In another embodiment, as shown in FIG. 11, the thickness of the end plate 18 may be the same as the thickness of the steel plates 13 and 14.

The present disclosure is not limited to the embodiments described above, and various modifications are possible within the scope of the present disclosure without departing from the spirit of the invention.

In an assumable example, an embedded magnet type rotor has a laminated core provided with a magnet insertion hole, a magnet inserted into the magnet insertion hole, and an end plate for closing the magnet insertion hole to prevent scattering of the magnet. A pin is provided on an end plate, and the pin is pressed into a hole of the laminated core to fix the end plate to the laminated core.

In order for the end plate to appropriately receive a load when the magnet is about to scatter, it is necessary to provide a press-fitting location of the end plate as radially outside the laminated core as possible. Further, it is necessary to provide the press-fitting location of the end plate so as to avoid the press-fitting location of a plurality of steel plates constituting the laminated core. For this purpose, it is conceivable that the press-fitting location of the end plate is provided at a position radially outside the press-fitting location of the plurality of steel plates and relatively close to the magnet insertion hole.

However, it is difficult for the magnetic flux of the magnet to pass through at the above-mentioned press-fitting location of the end plate, and magnetic saturation at that location tends to occur. Therefore, if the press-fitting location of the end plate is provided at a position near the magnet insertion hole, the magnetic characteristics of the embedded magnet type rotor may be deteriorated.

The present disclosure has been made in view of the above points, and an object of the present disclosure is to provide an embedded magnet type rotor in which a decrease in magnetic characteristics is suppressed.

The present disclosure relates to an embedded magnet type rotor used for a rotating electric machine. The embedded magnet type rotor has a laminated core which is formed by laminating a plurality of steel plates, and a magnet provided in a magnet insertion hole of the laminated core, and an end plate provided at an end portion of the laminated core so as to close the magnet insertion hole.

The pair of adjacent first steel plates are fixed by pressing a steel plate fixing protrusion of one first steel plate into a steel plate fixing hole of the other first steel plate. The end plate and the laminated core are fixed by pressing a plate fixing protrusion of the end plate into a plate fixing hole of the laminated core. The steel plate fixing hole and the plate fixing hole are alternately arranged in a circumferential direction.

Thereby, the press-fitting location of the end plate can be provided at a position appropriately separated from the magnet insertion hole while avoiding the press-fitting location between the plurality of steel plates. For this reason, the press-fitting location of the end plate is not provided in the path of the magnetic flux M of the magnet, and magnetic saturation hardly occurs. That is, the press-fitting location of the end plate can be provided at a position where the magnetic characteristics is not affected. Therefore, a decrease in the magnetic characteristics of the embedded magnet type rotor is suppressed.

What is claimed is:

1. An embedded magnet type rotor used for a rotating electric machine, comprising:
    a laminated core formed by laminating a plurality of steel plates;
    a magnet provided in a magnet insertion hole of the laminated core; and
    an end plate provided at an end of the laminated core so as to close the magnet insertion hole, wherein
    a pair of adjacent steel plates are fixed by pressing a steel plate fixing protrusion of one of the steel plates into a steel plate fixing hole of an other steel plate,
    the end plate and the laminated core are fixed by pressing a plate fixing protrusion of the end plate into a plate fixing hole of the laminated core, and
    the steel plate fixing hole and the plate fixing hole are alternately arranged in a circumferential direction, wherein
    the laminated core has a shaft holding portion, a magnet holding portion, and a plurality of connecting portions extending radially from the shaft holding portion to the magnet holding portion,
    the shaft holding portion is located on an inner peripheral side of the laminated core and has an insertion hole through which a rotating shaft is inserted,
    the magnet holding portion is located on an outer peripheral side of the laminated core and has the magnet insertion hole,
    in the plurality of connecting portions, each connecting portion arranged at odd-numbered positions on the basis of a predetermined one are referred to as a first connecting portion, and each connecting portion arranged at even-numbered positions are referred to as a second connecting portion,
    the steel plate fixing hole is arranged at the same circumferential position with respect to the first connecting portion, and
    the plate fixing hole is arranged at the same circumferential position with respect to the second connecting portion.

2. The embedded magnet type rotor according to claim 1, wherein
    the steel plate fixing hole and the plate fixing hole are arranged at a connection part between the plurality of connecting portions and the magnet holding portion.

3. The embedded magnet type rotor according to claim 1, wherein
    the end plate is made of austenitic stainless steel.

4. The embedded magnet type rotor according to claim 1, wherein
a thickness of the end plate is larger than a thickness of the steel plates.

5. The embedded magnet type rotor according to claim 1, wherein
a cross-sectional shape of the plate fixing protrusion is the same as a cross-sectional shape of the steel plate fixing protrusion.

6. The embedded magnet type rotor according to claim 1, wherein
the plurality of connecting portions are provided at equal intervals in the circumferential direction, and
a plurality of steel plate fixing holes are provided at equal intervals in the circumferential direction and a plurality of plate fixing holes are provided at equal intervals in the circumferential direction.

7. An embedded magnet type rotor used for a rotating electric machine, comprising:
a laminated core formed by laminating a plurality of steel plates;
a magnet provided in a magnet insertion hole of the laminated core; and
an end plate provided at an end of the laminated core so as to close the magnet insertion hole, wherein
a pair of adjacent steel plates are fixed by pressing a steel plate fixing protrusion of one of the steel plates into a steel plate fixing hole of the other steel plate,
the end plate and the laminated core are fixed by pressing a plate fixing protrusion of the end plate into a plate fixing hole of the laminated core, and
the steel plate fixing hole and the plate fixing hole are alternately arranged in a circumferential direction, wherein
the steel plate fixing hole and the plate fixing hole are arranged on the same circumference.

8. The embedded magnet type rotor according to claim 7, wherein
the end plate is made of austenitic stainless steel.

9. The embedded magnet type rotor according to claim 7, wherein
a thickness of the end plate is larger than a thickness of the steel plates.

10. The embedded magnet type rotor according to claim 7, wherein
a cross-sectional shape of the plate fixing protrusion is the same as a cross-sectional shape of the steel plate fixing protrusion.

* * * * *